(12) United States Patent
Doemens et al.

(10) Patent No.: US 6,633,172 B1
(45) Date of Patent: Oct. 14, 2003

(54) CAPACITIVE MEASURING SENSOR AND METHOD FOR OPERATING SAME

(75) Inventors: Günter Doemens, Holzkirchen (DE); Markus Gilch, Mauern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/830,621

(22) PCT Filed: Nov. 5, 1999

(86) PCT No.: PCT/DE99/03551

§ 371 (c)(1),
(2), (4) Date: Apr. 27, 2001

(87) PCT Pub. No.: WO00/28293

PCT Pub. Date: May 18, 2000

(30) Foreign Application Priority Data

Nov. 6, 1998 (DE) .......................................... 198 51 314

(51) Int. Cl.[7] .......................... G01R 27/26; G01B 7/16
(52) U.S. Cl. ..................... 324/661; 73/780; 73/862.626
(58) Field of Search ............................ 73/780, 862.337, 73/862.626, 862.68; 324/661, 660, 519, 658

(56) References Cited

FOREIGN PATENT DOCUMENTS

| DE | 34 17 212 C2 | 1/1985 |
|----|--------------|--------|
| DE | 42 15 258 A1 | 11/1993 |
| DE | 32 23 987 C2 | 1/1998 |
| EP | 0 759 628 A1 | 2/1997 |
| JP | 57042829 | 3/1982 |

*Primary Examiner*—N. Le
*Assistant Examiner*—Vincent Q. Nguyen
(74) *Attorney, Agent, or Firm*—Harness, Dickey & Pierce, P.L.C.

(57) ABSTRACT

A capacitive measuring sensor which detects changes in an angle of electrode surfaces arranged at an acute angle to one another. The sensor outputs capacitive changes as a sensor signal. The sensor is preferably elongated and has at its end regions two fastening elements for connection to a body to be measured, two capacitor electrodes and two fastening elements. Changes in the angle of the capacitor electrodes is effected by displacement between the fastening points on the object to be measured.

15 Claims, 4 Drawing Sheets

CAPACITIVE MEASURING SENSOR AND METHOD FOR OPERATING SAME

BACKGROUND OF THE INVENTION

1. Field of the Invention

The present invention generally pertains to capacitive measuring sensors, and in particular to capacitive measuring sensors for measuring force, torque, strain or torsion associated with a component upon which the sensor is fitted.

2. Discussion of the Related Art

Various types of capacitive torque or force sensors are known in the prior art. Torques and forces are currently generally measured in the industrial sector with the aid of measuring cells which are fitted with strain gauges, or the strain gauges are applied directly to the measuring point on a component. Because of the material combinations and the small size, high accuracy is required when sticking on strain gauges. This is very cost intensive, in particular in the case of series production or non-stationary applications such as, for example, in automobiles. In the case of strain gauges, the cemented joints exhibit great weaknesses with regard to long term performance, since their serviceability is strongly impaired by the influence of moisture, and it is not possible to ensure resistance to continuous loading.

Specific capacitive torque and force sensors are equipped with planar comb-shaped electrode structures which convert a force or a torque with corresponding strain or torsion into a change in capacitance. The displacements occurring in the process are only a few micrometers. In this case, the electrode spacing changes in accordance with a displacement at the measuring point. This application of a sensor is substantially simpler than strain measuring cells, and its long term stability is likewise substantially better. Likewise, this type of sensor can also be installed without difficulty on site, that is to say essentially in mobile units or systems.

It is generally a disadvantage of previous sensors that their electrode spacing is used as the measured variable, since the setting of small electrode spacing is problematical. Moreover, plane-parallel capacitor electrodes must be moved toward or away from one another while maintaining the mutual alignment. In the case of capacitive sensors, whose electrode structure is in the form of a comb, two comb structures fitted in a mutually insulated fashion must be mounted and guided parallel to one another to an extremely high degree. Furthermore, high accuracies are required in the division when producing the comb structures. These aspects have high production costs, even in batch-quantity runs. Furthermore, the minimum electrode spacing, and thus the sensitivity of the sensor principle are limited by tolerances owing to mounting.

Japanese Patent Publication JP-A-57/042829 discloses a pressure transducer which measures the input pressure on a diaphragm with high accuracy by capacitively detecting a corresponding relative movement between two electrodes.

European Patent Application EP-A-0 759 628 describes a variable capacitor having a movable region. Upon appropriate variation in the movable region, an element is displaced in such a way that a variation in the capacitance of the capacitor occurs. The capacitance set is fixed in each case, and the capacitor does not serve to take up measured values.

The present invention departs from prior art capacitive sensor principles, in which variations in the spacing of plane-parallel electrodes is evaluated. Instead, the present invention uses variations in the angles of electrodes or electrode surfaces arranged at an acute angle or in a wedge-shaped fashion relative to one another as the sensing.

Measuring signals, in particular variations in capacitance, can be determined in order to determine distances/displacements, torsions, and strains or forces and torques. Thus, the sole precision technology required is in the production of very plane active electrode surfaces which are opposite one another and cooperate capacitively.

The overall arrangement of the present invention can be designated as a wedge or a wedge-shaped structure. Due to the fact that capacitance faithfully obeys the relationship $c \approx 1/d$, where $c$=capacitance and $d$=electrode spacing, sensors using this principle need not be calibrated.

Therefore, a sensor arrangement has extremely low stray capacitances and low capacitances of second order. Temperature dependence of capacitive sensors, which is already very weak, is improved by use of an angle spacing which is absolutely uniform, and is measured is a capacitance, or its reciprocal, without regard to changes in electrode spacing caused by unwanted variation.

The sensor of the present invention is elongated and partially plate-shaped. It is connected at its end regions by means of a two-point connection, that is to say a force-close connection at each end to a body, for example a shaft, to be measured. Orientation of the elongated sensor relative to the body to be measured is such that displacements owing to strains or torsions offset against one another at the fastening points of the two-point connection between the sensor and the body to be measured. A first electrode is connected to an object to be measured by means of a fastening element. A support for a second electrodes is likewise rigidly connected to this fastening element, and the rigid support is therefore not directly connected to the body to be measured. The first electrode is plane in design in its middle region between the fastening points, and is not situated parallel opposite the second electrode, which is located on the support.

The first electrode is designed to be metallically conducting only on the surface. The second electrode is expediently mounted on an insulating support. All the electrodes are constructed to be as plane as possible on their active surface.

The advantages of such a capacitive measuring sensor include a high output capacitance in conjunction with a low overall volume. Furthermore, there is a high linearity (1/C), and temperature drift of the zero point is very slight, thermally induced strains are minimal and the measuring sensor requires no complicated adjustment, such as precision adjustment of electrodes, during mounting. In addition, necessary manufacturing tolerance are slight with regard to the response characteristic, therefore, there is no need for calibration.

The parts of the capacitive sensor which constituted the electrodes are produced using thin-layer technology in order to achieve a high-precision planarity, and the first electrode is of single design, while the two second electrodes cooperate capacitively opposite one another on the support.

An integrated circuit (IC), which outputs a signal representing the capacitance or the reciprocal thereof, because of its small size, can be fitted on the support for the purpose of logging measured values. The IC can also be used for data transmission of the capacitive measurements. The sensor can preferably be surrounded by a housing in order to protect against aggressive and harsh environmental influences.

If the surface of the electrodes is of plane design, and an imaginary point of intersection of the angularly set electrodes or electrode surfaces equates to the center of rotation for variations in angle, a simple mathematical relationship applies for changes in spacing of electrodes with regard to a change in capacitance.

Displacements or distances, torsions, strains, forces and torques can be measured reliably with the aid of such a measuring sensor.

SUMMARY OF THE INVENTION

It is an object of the invention to provide a capacitive measuring sensor of simple design having an improved sensibility.

It is another object of the invention to provide a capacitive measuring sensor that uses variations in the angle of electrodes or electrode surfaces arranged at an acute angle or in a wedge-shaped fashion, relative to one another, as sensing elements.

It is an additional object of the invention to provide a capacitive measuring sensor having electrodes that use thin-layer technology in order to achieve a high-precision planarity.

These and other objects of the invention will become apparent upon careful review of the following detailed description of the preferred embodiment, which is to be read in conjunction with a review of the accompanying drawing figures.

DETAILED DESCRIPTION OF THE PREFERRED EMBODIMENTS

Figure 1:
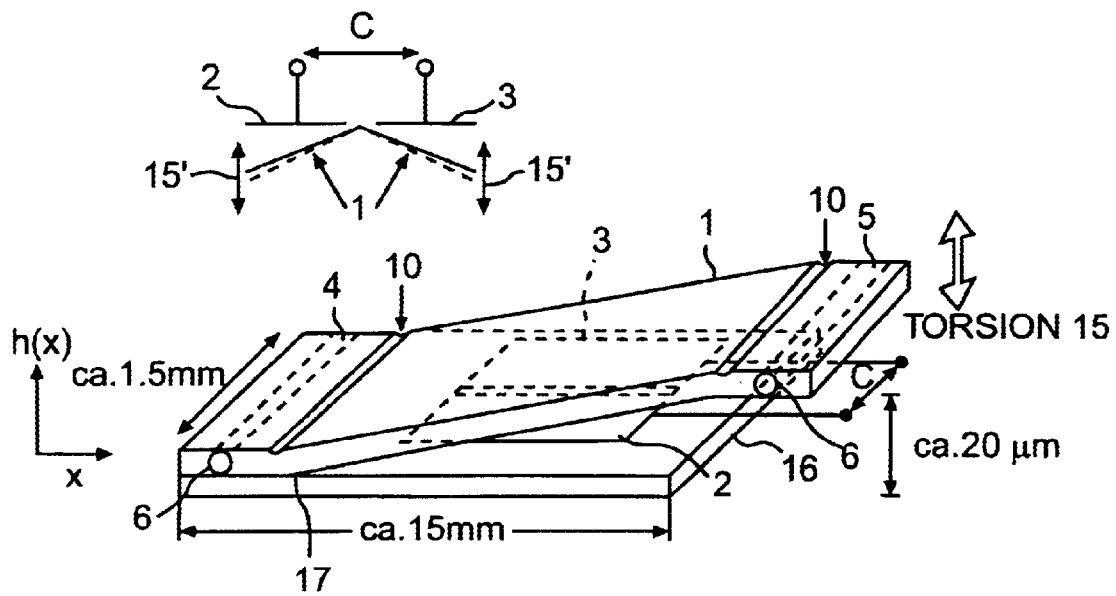
FIG. 1 shows a capacitive torque sensor according to the present invention.

FIG. 1 shows a capacitive torque sensor for torsion angle measurement, with an equivalent circuit diagram for the electrodes, in accordance with the present invention.

In order to bypass the insulated mounting of the electrodes the wedge-shaped structure illustrating the sensor in FIG. 1 is varied according to the invention from an insulating and a metallically conducting part. An insulating support 16 has two second electrodes 2,3 applied using thin-layer technology. The electrodes 2,3 are capacitively coupled to a metallic part of the body of a first electrode 1. An acute angle a is formed between the first electrode 1 and the insulating support 16. In this arrangement, the first electrode 1, situated on the top in FIG. 1, is the counter electrode to the electrodes 2,3. Capacitance is measured between the electrode 2,3.

Edge regions or fastening elements 4,5 outside weak points 10 consist of non-conducting materials. There is no direct contact between opposite electrodes, which are set at an acute angle to one another. Thus, the acute-angled opening for the arrangement shown in FIG. 1 does not fall below a minimum angle. Moreover, strain of the electrodes 2,3 on the insulating support 16 is sufficiently limited in the direction of the rigid mutual connection between the support 16 and the first electrode 1.

FIG. 1 also shows an equivalent circuit diagram having electrodes 1,2,3, between which a capacitance C is measured. The direction of movement 15 shown in FIG. 1, in this case of the first electrode 1, corresponds to a change in angle between electrodes 1 and 2 or 1 and 3, relative to the direction of movement 15'. Corresponding capacitances are connected in series. Torsion direction 15, fastening elements 4,5, weak points 10 and capacitance C are also shown in FIG. 1. Also shown in FIG. 1 are fastening points 6 for indicating the fastening position on the object to be measured, and a point of rotation 17.

Figure 2:
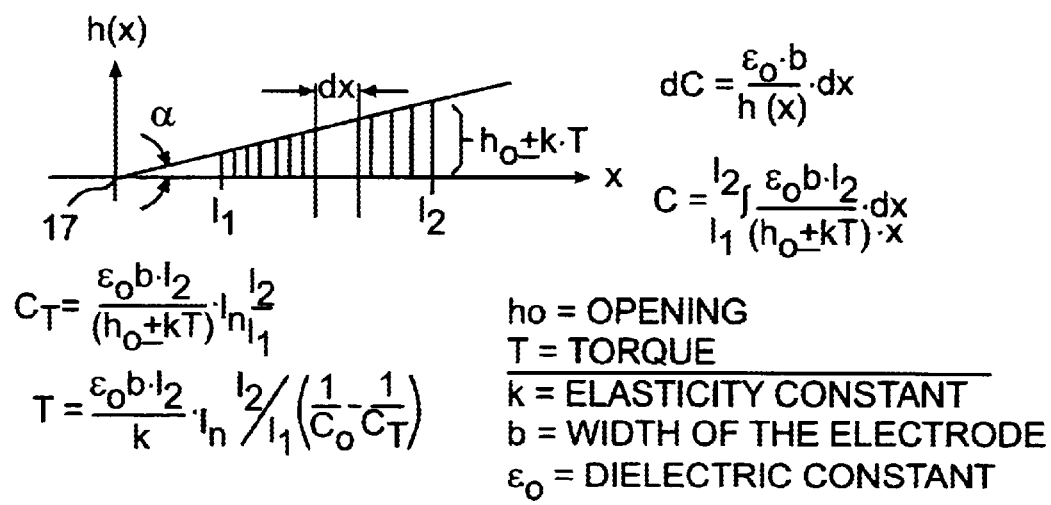
FIG. 2 shows a schematic diagram of the geometrical relationships according to the present invention.

FIG. 2 shows a transfer function of the capacitive sensor in the form of an h(x)/x diagram, wherein h(x) is deflection and x is electrode length. The x-direction signifies the longitudinal extent of electrodes 1, 2, 3. The geometric design of the sensor is chosen in order to achieve a sufficient distance between the fastening points 6. A rectangular elongated flat design of electrodes 1,2,3 is expedient, but could also be of different shape. In FIG. 2, the length of active electrode surfaces corresponds to the distance between $I_1$ and $I_2$. The deflection h(x) can be represented by $h_0 \pm k \cdot T$ or $h_0 \pm \Delta h$.

Dependence of the torque T on a capacitance C, or a change in capacitance DC, is represented in the formulas in FIG. 2. Solving for the torque T yields the formula, or the transfer function of the capacitive sensor for torque measurement. Here, the variables used individually signify: k=elasticity constant, $\epsilon_0$=dielectric constant, b=width of the electrode, T=torque, C=capacitance, $I_2-I_1$=length of the electrode. In addition, $C_0$=quiescent state capacitance and $C_T$=operating state capacitance.

The capacitor electrodes are of a flat design having planar surfaces set at an acute angle to one another with their point of geometric intersection constituting the center of rotation for a change in the angle between them, such that the following relationship holds:

$$\frac{1}{c} = \frac{h_0 + \Delta h}{\epsilon_0 b l_2 \cdot \ln\frac{l_2}{l_1}}$$

wherein $I_1$, $I_2$ are the starting and final points of the electrodes from the center of rotation upward, b is the width, $\epsilon_0$ is the dielectric constant, $h_0$ is the initial opening and $\Delta h$ is the change in distance. Thus, a distance to be measured can be converted into a corresponding change in the angle between the electrodes, with a correspondingly invariable change in capacitance.

Figure 3:
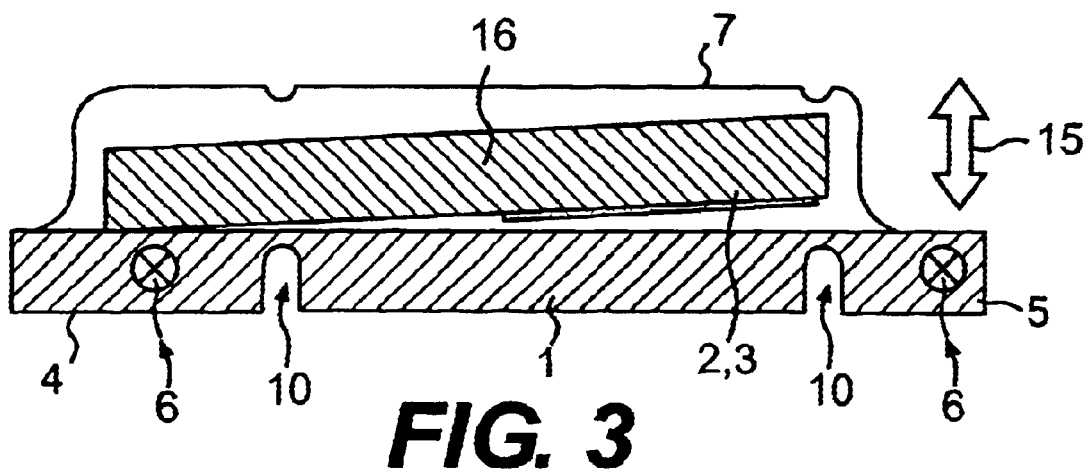
FIG. 3 shows a sectional view of the sensor according to the present invention.

FIG. 3 shows a sensor according to the present invention in sectional plan view. A single-piece first electrode 1, is situated at the bottom, and is electrically conducting at least in its middle region. A first electrode 1 has two fastening points 6 on fastening elements 4, 5 which are constructed on opposite ends of the first electrode 1. Consequently, contact with the body to be measured exists only in the end regions of the first electrode 1, which is situated at the bottom in FIG. 3.

The electrode is designed, such that it can be deformed by weak points 10 so that it is possible to detect relative movements between the two fastening points 6 from changes in capacitance of the electrode system comprising electrode 1 and electrodes 2,3. In this case, the sensor is perpendicular to the surface of a body to be measured. The surface of the body to be measured is situated in the plane of the paper in FIG. 3, and the sensor is fitted perpendicularly thereon. The width of the sensor extends at right angles to the plane of the paper and its length extends from left to right. In accordance with the direction of movement, 15,15' because of a force or a torque to be measured, a displacement is now effected on the object surface. Thus, the sensor can be used to detect a change in capacitance resulting therefrom, This takes place, for example, in such a way that the left-hand fastening point 6 is static, and the right hand fastening point 6 is displaced in a fashion corresponding to the direction of movement 15. The result of this is a variation in the capacitance of the electrode system by virtue of the fact that the first electrode 1 executes a chance in angle relative to the electrodes 2,3. A transmission of a torque from the right-hand fastening point 6 on the fastening element 5 to the middle region of the first electrode 1 is excluded by the weak points 10.

The relatively small variations in position caused by forces, torques or strains therefore effect a variation in angle by movements at the weak points 10 of the first electrode 1. Of the fastening points 6, at least the left-hand point, in whose region the rigid support 16 is fitted, is rigidly connected to the object to be measured. The second fastening point 6 is preferably likewise rigidly connected to the object to be measured. In order to be freely moveable, the middle part of the first electrode 1 should make no contact with the object to be measured. The reference numeral 7 represents a housing which covers and seals the sensor in a partially flexible fashion and is mounted on the first electrode 1. The housing 7 is intended to protect against harmful environmental influences. It must be at least dust and moisture proof.

Figure 4:
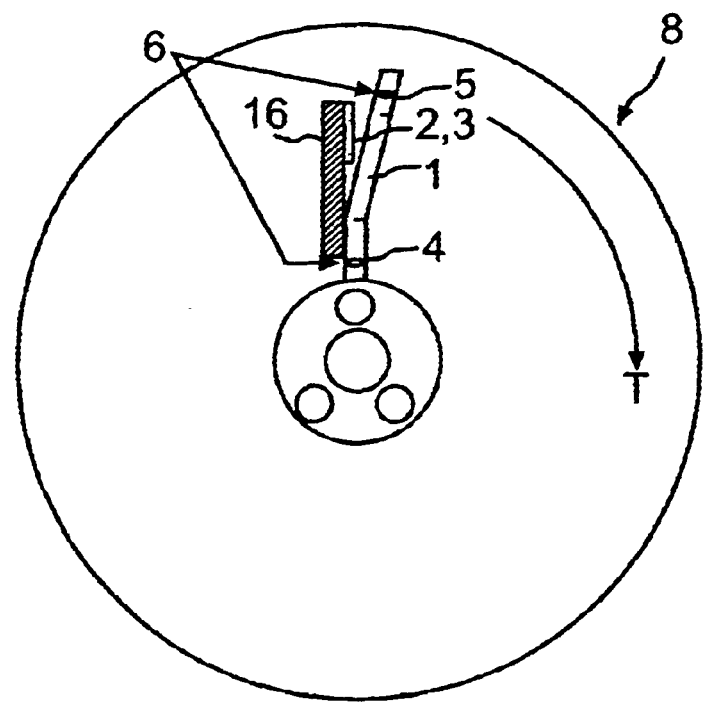
FIG. 4 shows direct torsion angle measurement according to the present invention.

FIG. 4 shows an illustration, corresponding to FIG. 3, of a capacitive sensor on a so-called flexible plate 8, as it would be used on a gearbox in the automotive industry. Shown in FIG. 4 are fastening points 6, insulating support 16, first electrode 1, and second electrodes 2,3. The direction of the torque T is indicated by an arrow. It is thereby possible to measure torque and strain at the output of the gearbox.

Figure 5:
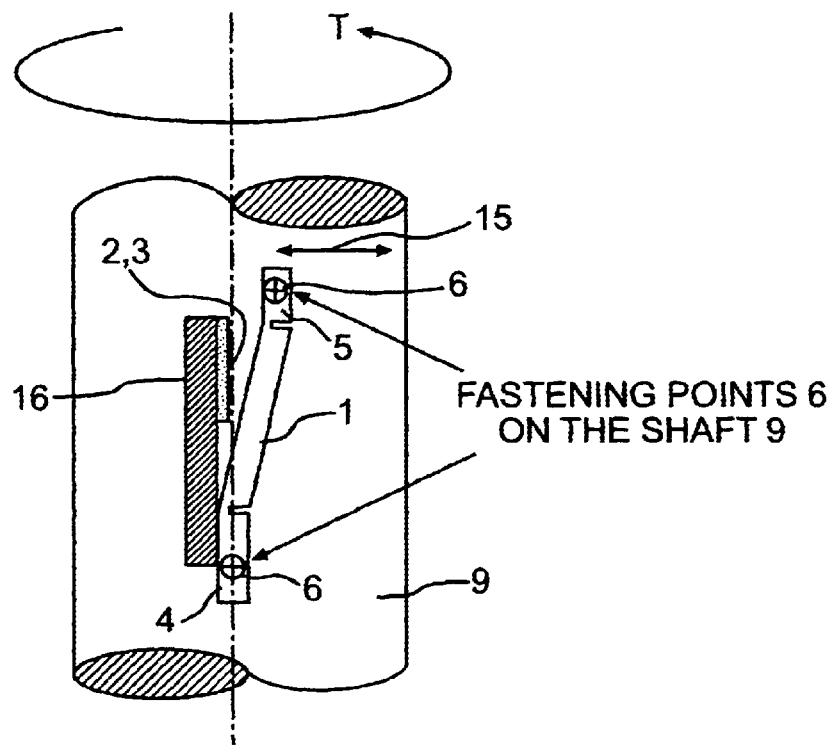
FIG. 5 shows the sensor fitted on a shaft according to the present invention.

FIG. 5 shows a capacitive sensor according to the invention mounted on a shaft 9 for measuring a torque T. The torque T in turn effects strains which occur in the torsion direction 15 and can be detected in the region between the two fastening points 6 by a corresponding displacement of these fastening points 6 relative to one another. The mode of operation proceeds, as before, and contact between the sensor and the shaft 9 is present only in the end regions of the first electrode 1 in the environment of the fastening points 6.

Support 16 is rigidly connected in a lower region to the first electrode 1 or to the fasting element 4. In this way, the capacitive sensor can be used to measure and quantify torques on a shaft by direct torsion angle measurement.

Figure 6:
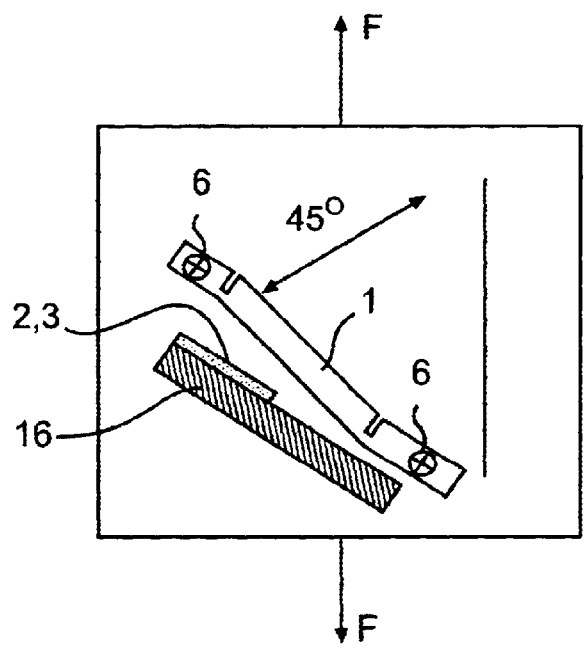
FIG. 6 shows measurement of force and/or strain according to the present invention.

FIG. 6 shows a capacitive sensor for detecting a distance by angle measurement or variation in angle according to the present invention. The structure corresponds to the previous description, wherein the sensor is aligned relative to the direction of force with its longitudinal extent, in this case below 45°. This occurs on the basis of the circumstance that the largest measurable relative displacements between the fastening points 6 occur below 45°. As shown in all of the Figures, the bent design of the middle part of the first electrode 1, constitutes neither an operating state nor a quiescent state.

What is important is the always present mutual orientation, which is wedge-shaped or aligned at an acute angle, of the oppositely situated electrodes 1,2,3. Force-induced strains or torques can be measured in any direction in accordance with the direction of movement 15, if the fastening points 6 are not positioned too close to one another.

In FIG. 4, the torque T will produce an enlargement of the angle at the capacitive sensor. In considering the sectioned sensor in FIG. 3, a direction of movement 15 of the right-hand fastening point 6 on the fastening element 5 downward will likewise result in an enlargement of the angle in the sensor. If the right-hand fastening point 6 shown in FIG. 3 is moved upward in the operating state starting from the quiescent state, this means a reduction in the aperture angle of the sensor. For optimum measurement, the angle at the sensor may not exceed predetermined maximum values. For instance, a height difference Δh of the sensor shown in FIG. 2 is 20 $\mu$m.

Figure 7:
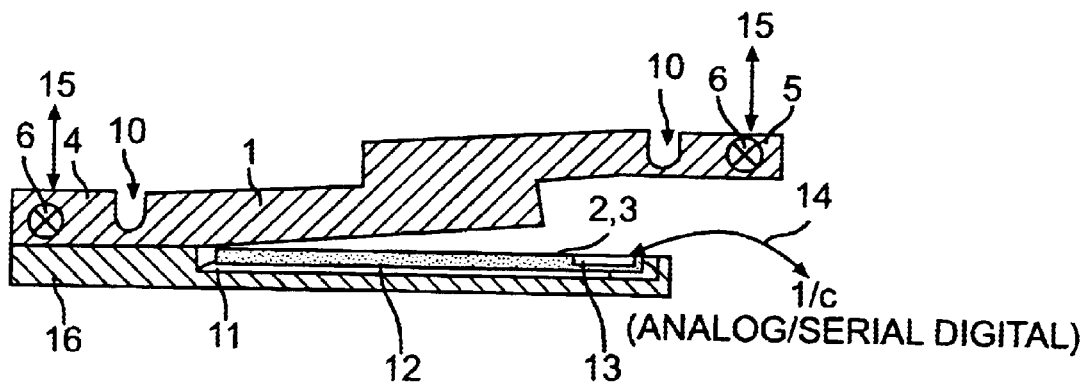
FIG. 7 shows capacitive torsion angle measurement according to the present invention.

FIG. 7 shows a sectional view of a capacitive measuring sensor corresponding to the present invention. The first electrode 1 is positioned on the fastening elements 4 and 5 in accordance with the fastening points 6 on an object to be measured in such a way that optimum or desired displacements are effected between the fastening points 6 in the case of mechanical loading of the object to be measured. The first electrode 1, which is of one-piece design, contains the fastening elements 4,5, weak points 10 being interposed.

In addition to the second electrodes 2,3, an electronic evaluation system 13, such as an IC chip, is applied to the insulating support 6, which is rigidly connected to the fastening element 4 but makes no contact with the object to be measured. An output signal 14 is led off via an appropriate line. Since the opening of the electrodes 1 and 2,3, which are set at an acute angle to one another, is very small, the first electrode 1 is shaped in such a way that an output signal can be tapped by means of a line. As shown in FIG. 7, the electronic evaluation system 13 is positioned in a depression in the support 16 together with a second electrodes 2,3 on a layer made from adhesive 11 with high-resistance silicon applied thereon.

Figure 8:
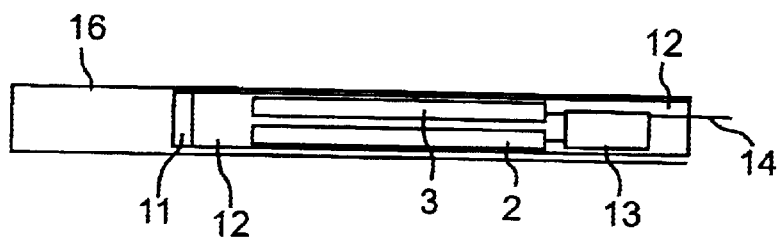
FIG. 8 shows a plan view according to the present invention.

FIG. 8 shows the support 16 discussed above in plan view without the first electrode 1. The second electrodes 2,3, which cooperate capacitively with the first electrode 1, are illustrated. The capacitance is tapped by the second electrodes 2,3 and appropriately processed in an electronic evaluation system 13.

It may be seen in FIG. 8 that the individual elements on the support 16 are located on the continuous layer of silicon 12.

Figure 9:
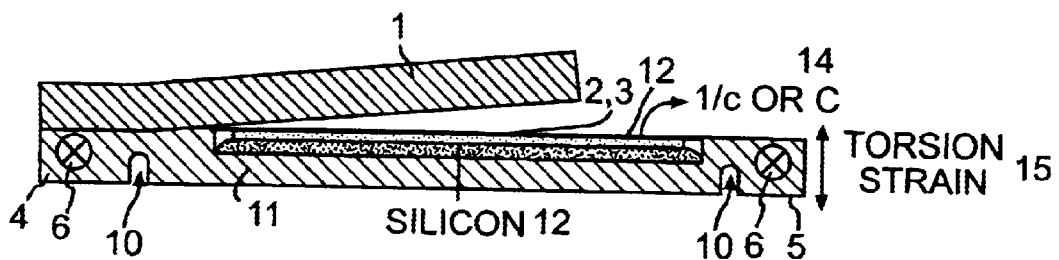
FIG. 9 shows a sensor according to the present invention.

FIG. 9 shows a further refinement of the invention similar to FIG. 7. In FIG. 9 the insulating support 16 is provided with fastening elements 4,5. Exactly as previously described, first electrode 1 is connected in its end region to the fastening element 4. First electrode 1 has a permanent bend in order to avoid contact between electrodes 1,2,3, and to constitute an angle in the quiescent state. The electrodes are likewise of metallic design and appropriately insulated electrically from the object to be measured or from the fastening points 6. In this case, the first electrode 1 makes no contact with the object to be measured, and the middle region of the insulating support 16 is configured to be freely movable.

Sensors using this principle need not be calibrated. One reason for this is the exceptionally low stray capacitances encountered in comparison to other capacitive principles and, likewise, low capacitances of second order. The temperature dependence, already very slight for capacitive sensors, is further improved by the transition from a change in spacing to a change in angle according to the present invention.

Other advantages of the present invention rest in the fact that instead of the change in the spacing or in the overlapping surface of a plate capacitor with parallel electrodes, changes in the angle of a sensor having capacitor electrodes arranged at an acute angle to one another are undertaken and/or evaluated. In addition, use of the support 16 and the first electrode 1 in conjunction with integrated circuits placed directly next to one another provides accurate measurement of capacitance. Also, the present invention is highly suitable for implementation as a microsystem.

Although modifications and changes may be suggested by those skilled in the art to which this invention pertains, it is the intention of the inventors to embody within the patent warranted hereon all changes and modifications that may reasonably and properly come under the scope of their contribution to the art.

What is claimed is:

1. A capacitive measuring sensor, comprising: at least two corresponding capacitor electrodes of flat design and having planar surfaces, set at an acute angle to one another, with their point of intersection constituting the center of rotation for a change in angle between the electrodes such that the following relationship holds:

$$\frac{1}{c} = \frac{h_0 + \Delta h}{\varepsilon_0 b l_2 \cdot \ln\frac{l_2}{l_1}}$$

where $l_1$, $l_2$ are the starting and final points of the electrodes from the center of rotation upward, b is the width, $\varepsilon_0$ is the dielectric constant, $h_0$ is the initial opening and $\Delta h$ is the change in distance, whereby a distance to be measured can be converted into a corresponding change in angle with a corresponding change in capacitance.

2. The capacitive measuring sensor as claimed in claim 1, further comprising:
   a first electrode constructed at opposite ends in one piece with a respective fastening element;
   said respective fastening elements rigidly connected to points on an object whose relative change in position is to be measured; and
   two or more second electrodes, each of which corresponds to said first electrode and constructed in a fashion insulated on a support rigidly connected to a fastening element, whereby the position of the first electrode is varied by relative movements between the fastening points, resulting in a change in angle between the corresponding electrodes.

3. The capacitive measuring sensor as claimed in claim 2, wherein articulations or weak points are present between the first electrode and the fastening elements.

4. The capacitive measuring sensor as claimed in claim 3, wherein the first electrode comprises a metallically conducting layer disposed on an insulating support.

5. The capacitive measuring sensor as claimed in claim 4, wherein said first and second electrodes comprises thin layers.

6. The capacitive measuring sensor as claimed in claim 5, wherein said second electrodes are connected capacitively via said first electrode.

7. The capacitive measuring sensor as claimed in claim 6, wherein said insulating support comprises an integrated circuit for logging measured values.

8. The capacitive measuring sensor as claimed in claim 7, wherein said first and second electrodes and an electronic evaluation system comprise comprises an integrated circuit.

9. The capacitive measuring sensor as claimed in claim 8, further comprising a housing which is dust and moisture proof.

10. The capacitive measuring sensor as claimed in claim 9, wherein at least one of said fastening elements is stationary relative to a distance to be measured, and at least one other fastening element is subjected to a displacement which corresponds to the distance to be measured.

11. The capacitive measuring sensor as claimed in claim 10, wherein said fastening elements are applied to the surface of an object to be measured.

12. The capacitive measuring sensor as claimed in claim 11, wherein said fastening elements are fitted in end regions of said support, and said first electrode is rigidly connected to at least one of said fastening elements.

13. The capacitive measuring sensor as claimed in claim 12, wherein said first electrode has an angle between a fastening end and a free end in order to form an acute angle inside the measuring sensor in the quiescent state.

14. A method for using a measuring sensor having capacitive electrodes and fastening elements, wherein changes in angle between the capacitive electrodes produces a change in capacitance which is converted in combination with material and geometric characteristics of an object to be measured, into forces, torques or strains, the method comprising the steps of:
   connecting the measuring sensor to said object to be measured using said fastening elements;
   measuring at least one of said forces, torques and strains relative to said object; and
   using an integrated circuit to log measured values.

15. The method as claimed in claim 14, further comprising the step of:
   positioning the measuring sensor via said fastening elements relative to the distance to be measured.

* * * * *